Sept. 2, 1958  L. J. BISHOP  2,850,139
CONVEYOR SYSTEM
Filed Nov. 29, 1954  4 Sheets-Sheet 1
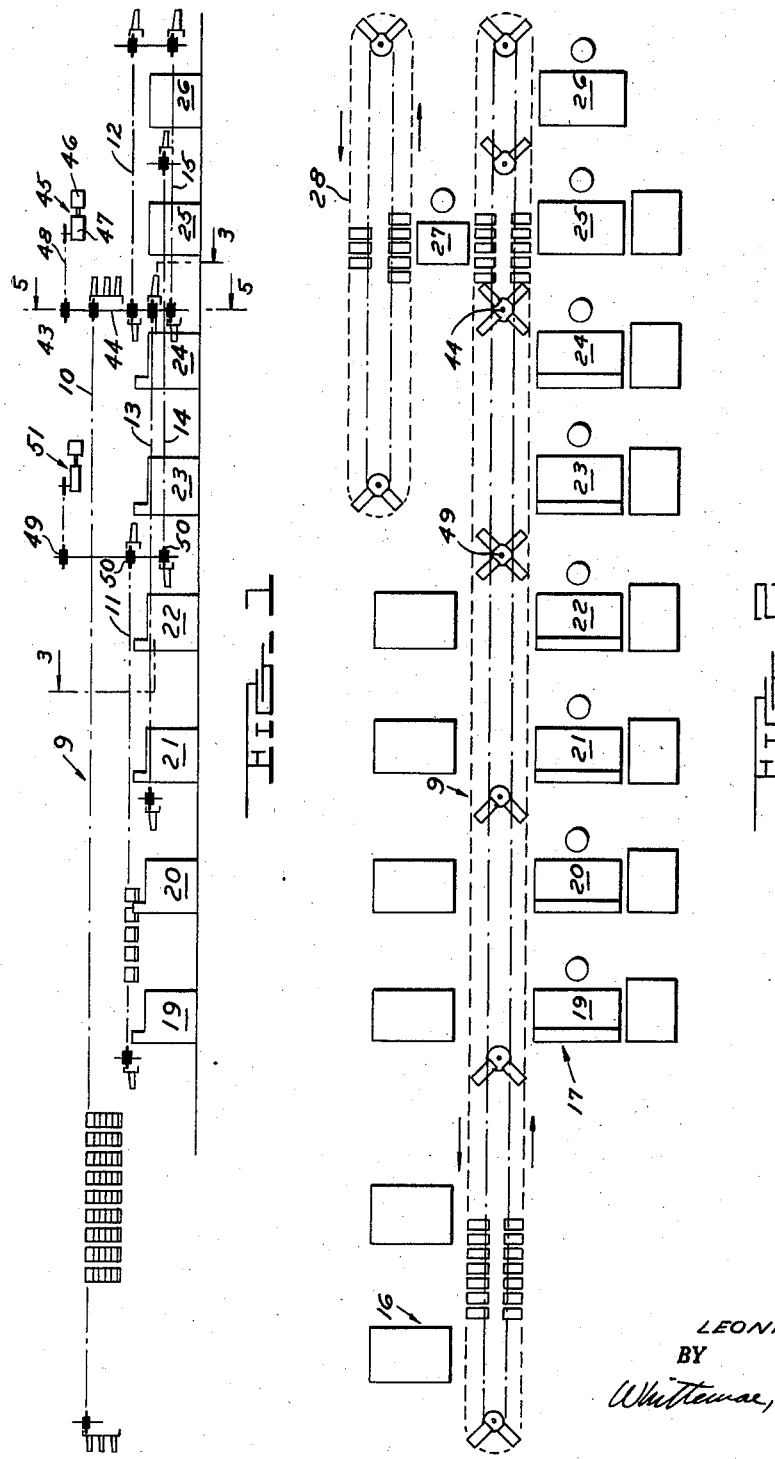
INVENTOR.
LEONARD J. BISHOP
BY
ATTORNEYS

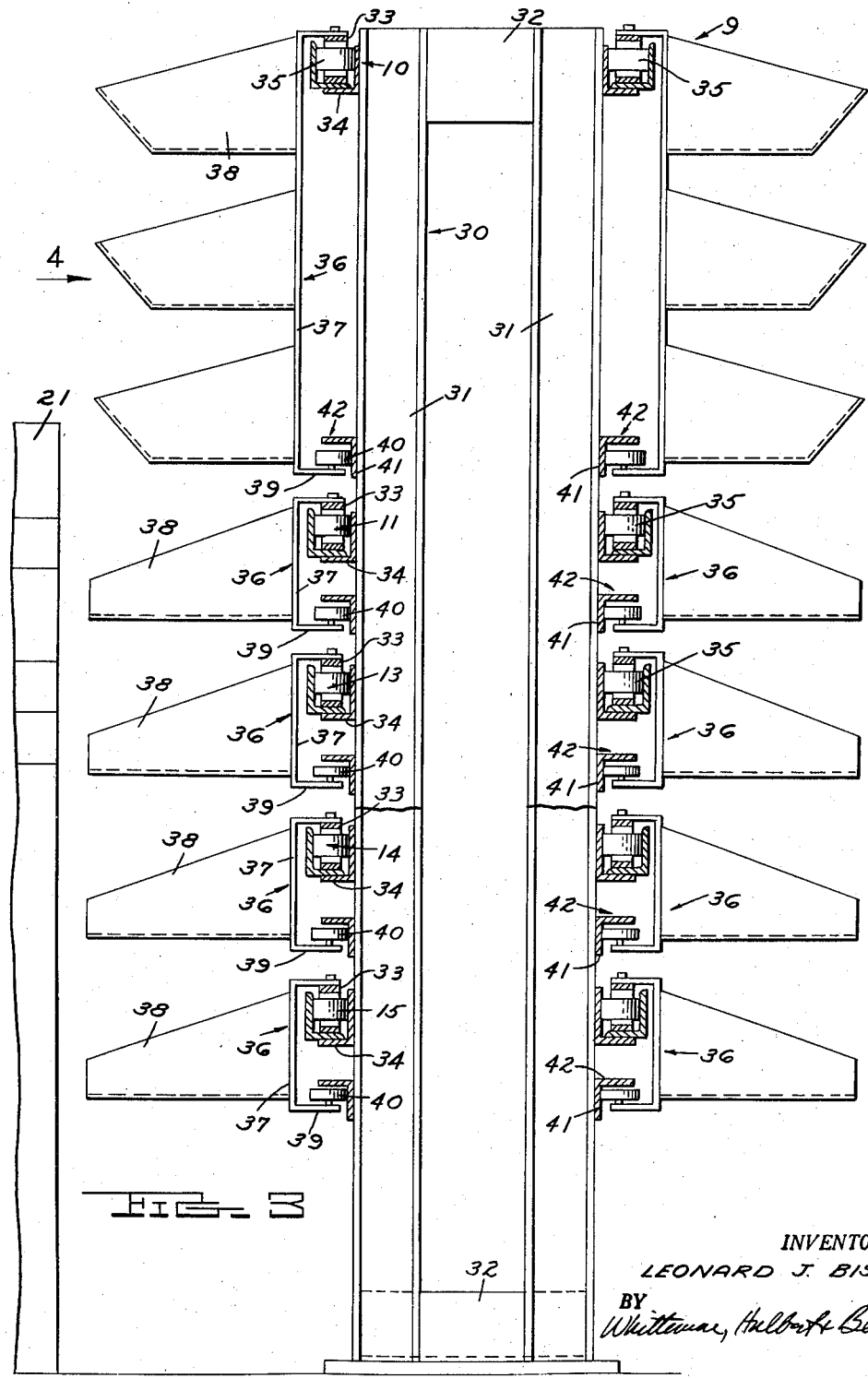

Sept. 2, 1958 L. J. BISHOP 2,850,139
CONVEYOR SYSTEM
Filed Nov. 29, 1954 4 Sheets-Sheet 3
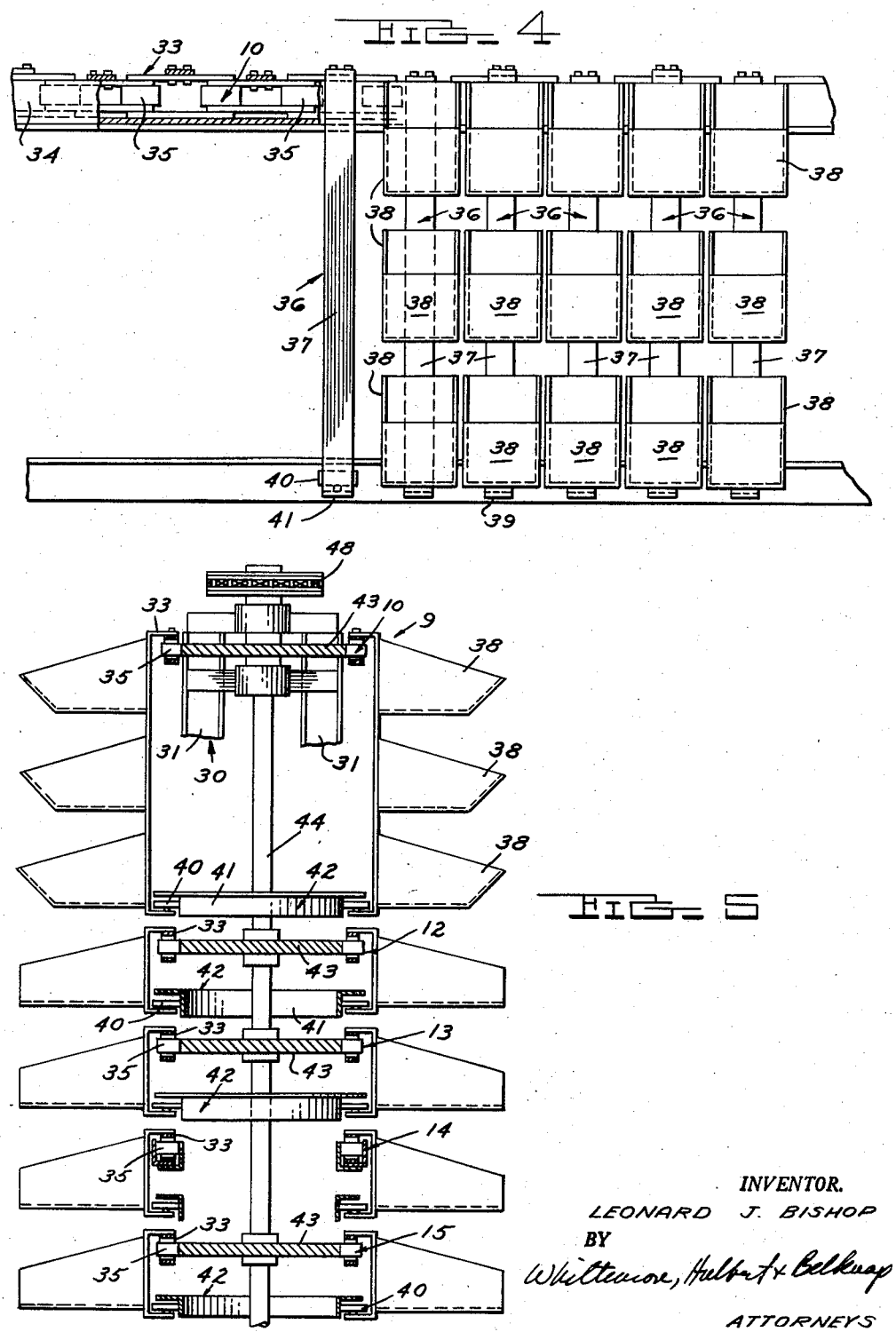
INVENTOR.
LEONARD J. BISHOP
BY
*Whittemore, Hulbert & Belknap*
ATTORNEYS Sept. 2, 1958 L. J. BISHOP 2,850,139
CONVEYOR SYSTEM
Filed Nov. 29, 1954 4 Sheets-Sheet 4
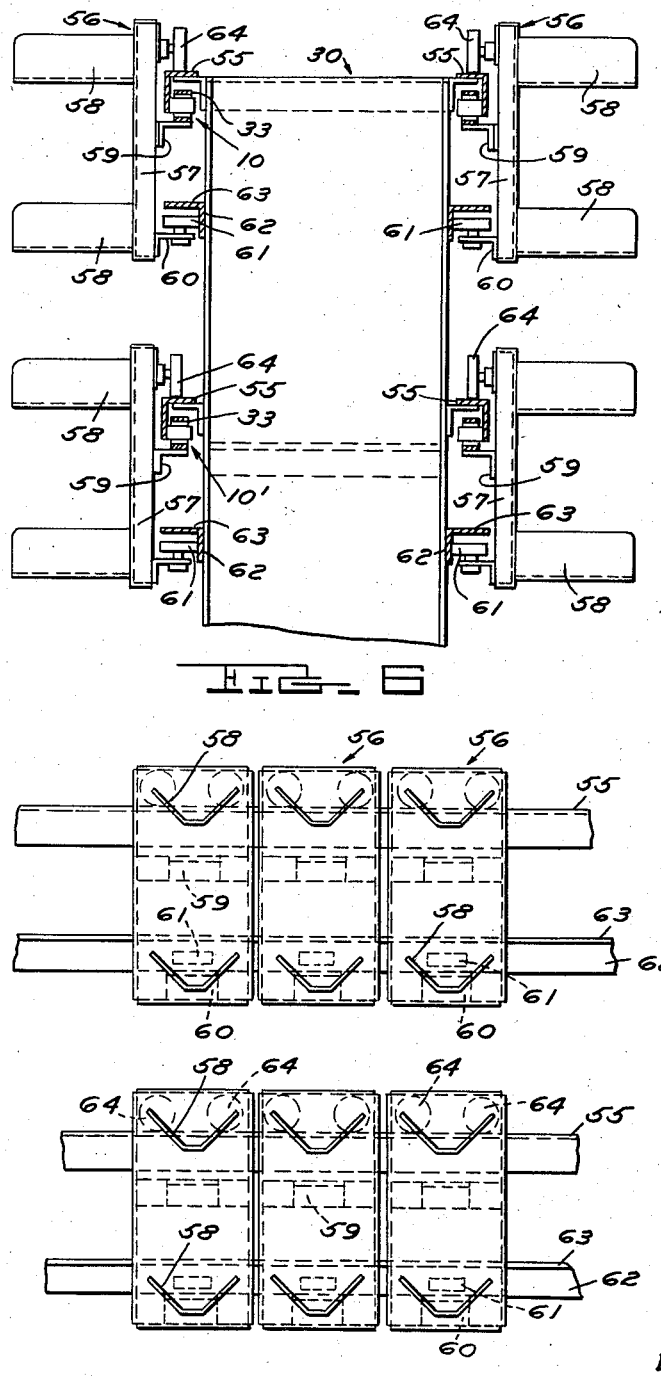
INVENTOR.
LEONARD J. BISHOP
BY
Whittemore, Hulbert & Belknap
ATTORNEYS United States Patent Office 2,850,139
Patented Sept. 2, 1958

2,850,139

CONVEYOR SYSTEM

Leonard J. Bishop, Birmingham, Mich., assignor to Mechanical Handling Systems, Inc., Detroit, Mich., a corporation of Michigan Application November 29, 1954, Serial No. 471,802

9 Claims. (Cl. 198—19)

This invention relates generally to conveyor systems and refers more particularly to improvements in conveyor systems of the type having a plurality of individual conveyors.

It is an object of this invention to provide a conveyor system comprising a plurality of article carrying conveyors supported one above the other in such relationship that a multitude of parts may be conveyed and handled in a space having a width which does not greatly exceed the width of one of said conveyors. Thus numerous different parts and/or sub-assemblies of a product may be conveyed along a relatively narrow path in such close relationship to stations at opposite sides of the path to enable personnel at said stations to conveniently place articles on and remove articles from the conveyors without leaving their stations.

It is another object of this invention to provide a conveyor system of the above general type wherein the individual conveyors are endless and are disposed with portions in overlying relationship. This arrangement renders it possible to install a number of separate conveyors in a relatively narrow aisle between a line of assembly stations or benches and a production line containing equipment for manufacturing the various individual parts of the product to be produced. Such an installation is advantageous in that it enables the parts produced by the various machines installed along the production line to be deposited on the article carrying trays at the adjacent side of one conveyor and permits removal of said parts from the opposite side of the conveyor by personnel at the assembly stations or benches. It also renders it possible to convey sub-assemblies from one bench to the other by the remaining conveyors of the system.

It is a further object of this invention to provide a conveyor system comprising vertically spaced endless conveyor chains having the adjacent ends arranged in overlying relationship and respectively driven by sprockets mounted on a common vertically extending drive shaft. This arrangement simplifies the conveyor structure and contributes materially to reducing the overall size thereof.

The foregoing as well as other objects will be made more apparent as this description proceeds especially when considered in connection with the accompanying drawings wherein:

Figure 1 is a diagrammatic side elevational view showing one application of a conveyor system embodying the features of this invention;

Figure 2 is a diagrammatic plan view of the system shown in Figure 1;

Figure 3 is a sectional view taken on the line 3—3 of Figure 1;

Figure 4 is a fragmentary side elevational view partly in section of the conveyor system;

Figure 5 is a sectional view taken on the line 5—5 of Figure 1;

Figure 6 is a fragmentary cross sectional view generally similar to Figure 3 showing a modified construction; and Figure 7 is a side elevational view of the structure shown in Figure 6.

The conveyor system selected herein for the purpose of illustration is indicated in the drawings by the numeral 9 and comprises a plurality of endless conveyors designated generally by the numerals 10, 11, 13, 14 and 15. The conveyors overlie one another in vertical spaced relationship and one typical application of the conveyor system is indicated diagrammatically in Figures 1 and 2 of the drawings. In detail, the several conveyors of the system 9 are arranged between a production line 16 containing the proper equipment for producing various parts of the product to be manufactured and an assembly line 17 embodying a plurality of assembly benches or stations where the parts previously produced by the production equipment are assembled.

In the present instance, the production line 16 comprises a number of appropriate machines 18 for manufacturing parts to be subsequently incorporated in the product and these machines are supported in such close relationship to one side of the conveyor system 9 that parts may be readily transferred directly from the respective machines to the adjacent side of the conveyor 10, for example. In this connection, it will be noted that the conveyor 10 extends for the full length of the production and assembly lines so that the parts deposited on the conveyor 10 as it travels past the machines 18 are subsequently advanced by the conveyor 10 along the assembly line 17. The parts are advanced by the conveyor 10 in such close relationship to the benches on the assembly line 17 that personnel stationed at these benches may readily and conveniently remove said parts from the adjacent side of the conveyor 10 as advancement of the latter continues along its path of travel.

With the specific arrangement of the conveyors illustrated herein, the parts assembled at the benches 19 and 20 may be readily deposited on the conveyor 11 and advanced to the benches 21 and 22. The sub-assemblies delivered by the conveyor 11 to the benches 21 and 22 may be readily removed from the conveyor 11 by the personnel stationed at the latter benches and the assembly operation continued. The parts assembled at the benches 21 and 22 may then be deposited on the conveyor 13 and advanced by the latter to the final assembly benches 23 and 24 where they may be quickly removed to enable completion of the assembly operation. It will be understood that the parts conveyor 10 is of sufficient length to travel past all of the benches 19–24 inclusive so that parts required to completely assemble the product are readily accessible to the personnel stationed at said benches.

The finely assemblies produced at the benches 23 and 24 may be deposited on the conveyor 14 and advanced to a bench 25. The operator at the bench 25 may readily remove the final assemblies from the conveyor 14 and make any adjustments or settings that may be required. Upon completion of this operation the product is transferred to the conveyor 15 and advanced by this conveyor to a bench 26. The operator at the bench 26 removes the assembled product from the conveyor 15 and after testing the product deposits the same on the conveyor 12. The conveyor 12 advances the product to a bench 27 where the product may be removed by the operator at the bench 27 and transferred to a conveyor 28. Any one of a number of operations may be effected at the bench 27 depending on the nature of the product. For example, a nameplate may be applied to the product at the bench 27 or the product may be packaged at this bench. In any case, the conveyor 28 serves to advance the completed product to any designated terminal.

It is apparent from the foregoing that the conveyors of the system actually travel in vertical stacked relationship so that a substantial number of conveyors may be installed within a space no wider than one of the conveyors. Such a conveyor system is particularly applicable in the manufacture of relatively small products composed of a substantial number of parts such, for example, as certain types of magnetic switches. Magnetic swtches particularly are composed of numerous relatively small parts which must be properly segregated and arranged for convenient accessibility to the various assembly stations. In accordance with this invention the parts may be properly segregated and conveyed to the various assembly stations with a minimum amount of handling. Also, subassemblies created at the various staitons may be advanced by the conveyor system to subsequent stations where additional operations may be performed.

With the above in view, reference is made more in detail to Figures 3–5 inclusive wherein it will be noted that the various conveyors of the system 9 are approximately of the same overall width and are arranged in vertical spaced overlying relationship with one conveyor directly above the other. The conveyors are carried by frame structure having upright frame sections 30 spaced from one another lengthwise of the conveyor system. One of the upright frame sections 30 is shown in Figure 3 of the drawings and it will be noted that this section comprises laterally spaced vertically extending members 31 having the opposite ends secured together by cross members 32.

Each of the several conveyors of the system 9 comprises an endless chain 33 of the pivoted link type and a supporting track 34. The tracks 34 extend for the full length of the respective chains between the supporting sprockets for the chains and are channel-shaped in cross section. The tracks terminate short of the supporting sprockets as shown in Figure 5. The channel-shaped tracks open in an upward direction to receive the respective chains 33 and the inner flanges of the tracks 34 are secured to the frame structure in any suitable manner. Rotatably mounted on the pivot pins for adjacent links of each chain are rollers 35 which occupy positions within the channels of the respective tracks 34 and have a rolling engagement with the inner surfaces of the opposite side walls of the tracks 34. The arrangement is such that the chains 33 are supported throughout their lengths between the supporting sprockets by the respective tracks 34 and are guided for movement along the paths of travel determined by the tracks 34.

Mounted on each conveyor chain 33 at points spaced from each other lengthwise of the chain are hangers 36 comprising vertically extending straps 37 depending from the chain and having one or more article supporting trays 38 at the outer side thereof. The upper ends of the straps are turned laterally inwardly and are secured to the links of the respective chains 33. The lower ends of the straps are turned laterally inwardly to provide flanges 39 which serve to rotatably support rollers 40 having their axes extending vertically. The rollers 40 respectively have a rolling engagement with a flange 41 of a guide 42 and the flanges 41 of the respective guides are fastened to the adjacent frame structure. The guides 42 extend continuuosly throughout the paths of travel of the respective chains 33 and have outwardly extending flanges at the upper ends of the flanges 41 which overlie the rollers 40 to limit upward displacement of the respective conveyor chains relative to the tracks 34. It is apparent from the above that the guides 42 cooperate with the rollers 40 to support the load carried by the trays 38 mounted on the heangers 36. In this connection it will also be noted that the parts conveyor 10 is supported at the top of the group and the hangers 36 are of sufficient length to accommodate a plurality of trays 38 in vertical spaced relationship. In the present instance, the hangers 36 associated with the remaining conveyors merely support a single tray 38 but it is to be understood that the length of these hangers may be increased to accommodate additional trays, if desired.

It has been stated above that each conveyor comprises an endless pivoted link type chain and in the present instance opposite ends of each chain 33 are respectively engaged by sprockets suitably mounted on the supporting structure. The grouping of the various conveyors of the system is such that the sprockets at one end of each of the conveyors 10, 12, 13 and 15 are in vertical axial alignment. With this in view, reference is made to Figure 5 wherein the sprockets for the respective conveyors 10, 12, 13 and 15 are indicated by the numeral 43. These sprockets are in vertical alignment with one another and are secured to a common vertical shaft 44 which is suitably journalled on the frame structure and is driven by power means 45. The power means 45 comprises a prime mover 46, a speed reducer 47, and a chain 48 for connecting the output of the speed reducer to the upper end of the shaft 44. Thus, common drive means is provided for each of the conveyors 10, 12, 13 and 15. The chains 33 of the conveyors 11 and 14 are driven by a common shaft 49 diagrammatically shown in Figure 1 of the drawings. The shaft 49 is suitably journalled on the frame structure and a pair of sprockets 50 are respectively secured to the shaft 49 in positions to engage the adjacent ends of the chains 33 for the conveyors 11 and 14. The shaft 49 is driven by power means 51 identical to the power means 45 previously described. As a result of the foregoing, the installation of the conveyor system is greatly simplified and the cost considerably reduced.

Figures 6 and 7 illustrate a slightly modified construction. As there shown, the conveyor 10 is again illustrated and comprises the endless chain 33 of the pivoted link type being guided along its path of travel by the guides 55. The guides 55 are similar to the tracks 34 but are of inverted generally channel cross section and respectively guide and direct the laterally spaced runs of the endless chain 33. The guides 55 extend for practically the full length of the chain runs and terminate short of the supporting sprockets. The guides 55 are secured to the frame structure 30 in any suitable manner as was the case with the tracks 34 in the previously described embodiment. The pivot pins for the adjacent links of the chain have rollers 35 rotatably mounted thereon which occupy positions within the channels of the guides 55 and have a rolling engagement with the inner surfaces of the opposite side walls of the guides. The arrangement is such that the chain 33 extends within the guides 55 and is guided for movement along the paths of travel determined by the guides.

The hangers are generally indicated at 56 and are mounted on the chain 33 at points spaced from each other lengthwise of the chain. Each hanger comprises a vertically extending strap 57 depending from the chain and having one or more article supporting trays 58 at the outer side thereof. Brackets 59 are secured to the inner sides of the straps at an intermediate point thereon and these brackets have laterally inwardly directed flanges which are secured to the pivot pins for the adjacent links of the chain. The lower ends of the straps are turned laterally inwardly to provide flanges 60 which serve to rotatably support rollers 61 having their axes extending vertically. The rollers 61 respectively have a rolling engagement with a flange 62 of a guide 63 and the flanges 62 of the respective guides are fastened to the adjacent frame structure. The guides 63 are substantially the same as the guides 42 described previously and extend continuously throughout the path of travel of the chain 33 and have outwardly extending flanges at the upper ends of the flanges 62 which overlie the rollers 61 to limit upward displacement of the conveyor chain.

Mounted upon the upper end portions of the straps 57 on the inner sides thereof are rollers 64, these rollers having their axes extending transversely of the path of travel of the chain and are positioned to have a rolling engagement with the upper surface of the base of the channel-shaped guide 55. It will thus be apparent that the weight of the straps together with that of any articles carried thereby is not carried by the chain but rather is supported by the guides 55. The chain itself is supported by the guides 55 by reason of the connection between the chain and the hangers. It will thus be apparent that the conveyor will serve to efficiently transport the hangers irrespective of the load carried thereby.

The conveyor 10', hangers and associated parts illustrated in Figures 6 and 7 are the same as the conveyor 10, hangers and associated parts shown in these same figures so that corresponding parts bear like characters of reference.

It is to be understood that the modification illustrated in Figures 6 and 7 is applicable to the form of the invention illustrated in Figures 1 to 5 and to any one of the conveyors 10 to 15 illustrated therein. In other words, it is contemplated that the guide 55 and construction of the hanger 56, while specifically applied to the conveyors 10 and 10' in Figures 6 and 7, may obviously be equally well applied to any of the other conveyors described in this specification.

What I claim as my invention is:

1. A conveyor system comprising supporting structure, a driving shaft mounted on the supporting structure for rotation about a vertical axis, sprockets secured on the drive shaft in spaced relation axially of said shaft, endless chains respectively having one end extending around said sprockets and extending horizontally from said sprockets in one direction in vertically overlapping relation different distances from the axis of said shaft, supporting sprockets respectively rotatable about vertical axes around which respectively extend the other ends of said chains, and article carrying means depending from said chains and extending between said chains in the region of overlapping thereof.

2. A conveyor system comprising supporting structure, a driving shaft mounted on the supporting structure for rotation about a vertical axis, sprockets secured on the drive shaft in spaced relation axially of said shaft, endless chains respectively having one end extending around said sprockets and extending horizontally from said sprockets in one direction in vertically overlapping relation different distances from the axis of said shaft, supporting sprockets respectively rotatable about vertical axes around which respectively extend the other ends of said chains, guides mounted on the supporting structure in positions to respectively engage the chains between the drive and driven sprockets and guide the latter along their paths of travel, hangers spaced from one another lengthwise of the respective chains and having the upper ends secured to and depending therefrom, said hangers extending between said chains in the region of overlapping thereof, guides mounted on the supporting structure in positions to respectively engage the lower ends of the hangers and guide the latter along their respective paths of travel, article carrying means mounted on the respective hangers, said first-mentioned guides comprising upwardly opening channel members for respectively slidably receiving and supporting said chains, rollers mounted on said chains at points spaced from one another lengthwise of the chains and having a rolling engagement with the side walls of the associated channel members, rollers on the lower ends of said hanger engageable with the respective second-mentioned guides, and work stations located at the overlap between successive chains.

3. A conveyor system comprising supporting structure, a driving shaft mounted on the supporting structure for rotation about a vertical axis, sprockets secured on the drive shaft in spaced relation axially of said shaft, endless chains respectively having one end extending around said sprockets and extending horizontally from said sprockets in one direction in vertically overlapping relation different distances from the axis of said shaft, supporting sprockets respectively rotatable about vertical axes around which respectively extend the other ends of said chains, guides mounted on the supporting structure in positions to respectively engage the chains between the drive and driven sprockets and guide the latter along their paths of travel, hangers spaced from one another lengthwise of the respective chains and having the upper ends secured to and depending therefrom, said hangers extending between said chains in the region of overlapping thereof, guides mounted on the supporting structure in positions to respectively engage the lower ends of the hangers and guide the latter along their respective paths of travel, article carrying means mounted on the respective hangers, said first-mentioned guides comprising downwardly opening channel members for respectively receiving said chains, rollers mounted on said chains at points spaced from one another lengthwise of the chains and having a rolling engagement with the side walls of the associated channel members, rollers on said hangers in position to engage the upper surface of the base of said channel members and thereby support said hangers on said channel members for movement as aforesaid, rollers mounted on the lower end portions of said hangers for rolling engagement with said second-mentioned guides, and work stations located at the overlap between successive chains.

4. A conveyor system comprising supporting structure, endless flexible linear members tandemly arranged in a predetermined succession and respectively movable along paths which overlap, guides mounted on the supporting structure in positions to respectively engage the linear members and guide the latter along the paths of travel aforesaid, hangers spaced from one another lengthwise of the respective flexible linear members and having the upper ends secured to the latter, guides mounted on the supporting structure in positions to respectively engage the lower ends of the hangers and guide the latter along their respective paths of travel, the guides for the flexible linear members being in the form of upwardly opening channel members for respectively slidably receiving and supporting said linear members, rollers mounted on the linear members at points spaced from one another lengthwise of the respective linear members and having a rolling engagement with the side walls of the associated channel members, and article carrying means mounted on the respective hangers.

5. A conveyor system comprising supporting structure, endless flexible linear members tandemly arranged in a predetermined succession and respectively movable along paths which overlap, guides mounted on the supporting structure in positions to respectively engage the linear members and guide the latter along the paths of travel aforesaid, hangers spaced from one another lengthwise of the respective flexible linear members and having the upper ends secured to the latter, guides mounted on the supporting structure in positions to respectively engage the lower ends of the hangers and guide the latter along their respective paths of travel, the guides for the flexible linear members being in the form of downwardly opening channel members for respectively receiving said linear members, rollers mounted on said linear members at points spaced from one another lengthwise of said linear members and having a rolling engagement with the side walls of the associated channel members, rollers on said hangers in position to engage the upper surfaces of the bases of said channels members and thereby support said hangers on said channel members for movement as aforesaid, and article carrying means mounted on said respective hangers.

6. A conveyor system comprising a flexible linear member supported for movement along a predetermined path, guide means for guiding said linear member along said path, hangers spaced from each other lengthwise of said member and secured thereto and depending therefrom, means engageable with the lower ends of said hangers to guide them along said path, said guide means comprising an upwardly opening channel for slidably receiving and supporting said linear member, rollers mounted on said linear member at points spaced from one another lengthwise of said linear member and having a rolling engagement with the side walls of said channel member, and article carrying means mounted on the respective hangers.

7. A conveyor system comprising a flexible linear member supported for movement along a predetermined path, guide means for guiding said linear member along said path, hangers spaced from each other lengthwise of said member and secured thereto and depending therefrom, means engageable with the lower ends of said hangers to guide them along said path, said guide means comprising a downwardly opening channel member for receiving said linear member, rollers mounted on said linear member at points spaced from one another lengthwise of said linear member and having a rolling engagement with the side walls of said channel member, rollers on said hangers in position to engage the upper surface of the base of said channel member and thereby support said hangers on said channel member for movement as aforesaid, and article carrying means mounted on said respective hangers.

8. A conveyor system comprising supporting structure, a driving shaft mounted on the supporting structure for rotation about a vertical axis, sprockets secured on the drive shaft in spaced relation axially of said shaft, endless flexible linear members respectively having one end extending around said sprockets and extending horizontally from said sprockets in one direction in vertically overlapping relation different distances from the axis of said shaft, supporting sprockets respectively rotatable about vertical axes around which respectively extend the other ends of said flexible linear members, guides mounted on the supporting structure in positions to respectively engage the flexible linear members between the drive and driven sprockets and guide the latter along their paths of travel, hangers spaced from one another lengthwise of the respective flexible linear members and having the upper ends secured to and depending therefrom, said hangers extending between said flexible linear members in the region of overlapping thereof, guides mounted on the supporting structure in positions to respectively engage the lower ends of the hangers and guide the latter along their respective paths of travel, article carrying means mounted on the respective hangers, said first-mentioned guides comprising upwardly opening channel members for respectively slidably receiving and supporting said flexible linear members, and rollers mounted on said flexible linear members at points spaced from one another lengthwise of the flexible linear members and having a rolling engagement with the side walls of the associated channel members.

9. A conveyor system comprising supporting structure, a driving shaft mounted on the supporting structure for rotation about a vertical axis, sprockets secured on the drive shaft in spaced relation axially of said shaft, endless flexible linear members respectively having one end extending around said sprockets and extending horizontally from said sprockets in one direction in vertically overlapping relation different distances from the axis of said shaft, supporting sprockets respectively rotatable about vertical axes around which respectively extend the other ends of said flexible linear members, guides mounted on the supporting structure in positions to respectively engage the flexible linear members between the drive and driven sprockets and guide the latter along their paths of travel, hangers spaced from one another lengthwise of the respective flexible linear members and having the upper ends secured to and depending therefrom, said hangers extending between said flexible linear members in the region of overlapping thereof, guides mounted on the supporting structure in positions to respectively engage the lower ends of the hangers and guide the latter along their respective paths of travel, article carrying means mounted on the respective hangers, said first-mentioned guides comprising downwardly opening channel members for respectively receiving said flexible linear members, rollers mounted on said flexible linear members at points spaced from one another lengthwise of the flexible linear members and having a rolling engagement with the side walls of the associated channel members, and rollers on said hangers in position to engage the upper surface of the base of said channel members and thereby support said hangers on said channel members for movement as aforesaid.

References Cited in the file of this patent

UNITED STATES PATENTS

| | | |
|---|---|---|
| 1,264,878 | McInnis | Apr. 30, 1918 |
| 1,440,204 | Alschuler | Dec. 26, 1922 |
| 1,441,661 | Church | Jan. 9, 1923 |
| 1,748,583 | Pade | Feb. 25, 1930 |

FOREIGN PATENTS

| | | |
|---|---|---|
| 483,043 | Italy | July 15, 1953 |